United States Patent Office 3,780,019
Patented Dec. 18, 1973

3,780,019
PRODUCTION OF ERYTHROMYCYLAMINE COMPOUNDS
Eric Wildsmith, Chamberley, England, assignor to Lilly Industries, Ltd., London, England
No Drawing. Filed Mar. 17, 1971, Ser. No. 125,400
Claims priority, application Great Britain, Apr. 13, 1970, 17,529/70
Int. Cl. C07c *129/18*
U.S. Cl. 260—210 E
8 Claims

ABSTRACT OF THE DISCLOSURE

Erythromycylamine compounds are produced by reduction of an erythromycin oxime, using transition metal ions which are in a low valency state and of suitable redox potential, to the corresponding imine, reduction of the latter producing the desired erythromycylamine.

---

Attempts to convert erythromycin into erythromycylamine (9 - amino - 3 - O - cladinosyl - 5 - O-desosaminyl-6,11,12 - trihydroxy - 2,4,6,8,10,12 - hexamethylpentadecane-13-olide) have been the subject of considerable synthetic effort. It is known that erythromycin reacts with hydroxylamine to form erythromycin oxime and that the latter may be catalytically reduced with platinum oxide at 700 p.s.i. hydrogen pressure to erythromycylamine. This reduction requires long reaction times of from 12 to 30 hours and very large and uneconomic catalyst to substrate ratios (1:2 w./w.) have to be employed—see E. H. Massey et al., Tetrahedron Letters, 157 (1970). In United Kingdom patent specification No. 1,100,504, it is also stated that the "oxime" may be reduced using sodium borohydride to the required "amine" but it has subsequently been shown—see the aforementioned paper by Massey et al.—that the "oxime" used in that specification is in fact the hydrochloride salt thereof and that the so-called reduction to the amine produces no more than the oxime base of that salt. Accordingly the uneconomic catalytic process is the only viable published process for obtaining erythromycylamine. The present invention is therefore concerned with providing an improved process for preparing erythromycylamines.

According to the present invention, erythromycylamine compounds of the formula:

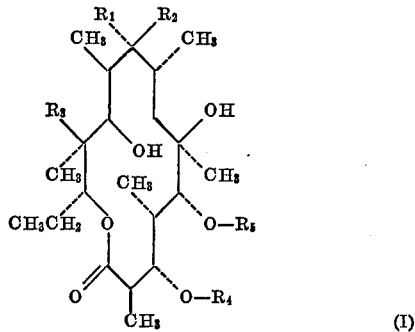

wherein $R_1$ and $R_2$ are different and are a hydrogen atom or an amino group, $R_3$ is a hydrogen atom or a hydroxy group, $R_4$ is a cladinosyl group and $R_5$ is a desosaminyl group, are prepared by a process which comprises reducing an erythromycin oxime of the general formula:

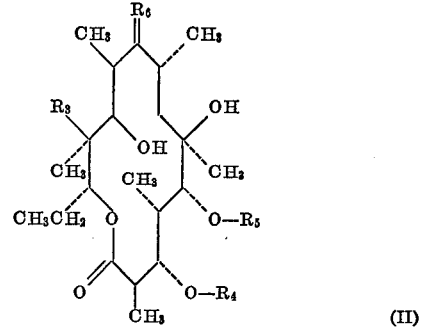

wherein $R_6$ is an =NOH group and $R_3$, $R_4$ and $R_5$ are as hereinbefore defined for Formula I, with transition metal ions, said ions being in low valence state and being of suitable redox potential so as to reduce said oxime to an intermediate reaction product (identified hereinafter as an imine, i.e. $R_6$ is an =NH group) and thereafter reducing said imine to form said erythromycylamine compound. Preferably the desired product or products are isolated, for instance, by solvent extraction.

The compounds encompassed by Formula I above are erythromycyl A and B amines and their corresponding epi-stereoisomers. The structure of each of these compounds may be shown as follows:

| Compound | $R_1$ | $R_2$ | $R_3$ |
|---|---|---|---|
| Erythromycyl: | | | |
| A amine | H | $NH_2$ | OH |
| B amine | H | $NH_2$ | H |
| Epi-erythromycyl: | | | |
| A amine | $NH_2$ | H | OH |
| B amine | $NH_2$ | H | H | and the term "erythromycylamine compound(s)" used herein is intended to include all of the erythromycylamines shown above.

The transition metal ions referred to above may be, for example, molybdenum, titanium, vanadium or chromium ions in a low valency state, most advantageously $Ti^{3+}$, $V^{2+}$ and $Cr^{2+}$. The ions may be derived from a transition metal compound supplied in stoichiometric quantities with respect to said oxime. Alternatively, however, they may be derived from a transition metal compound supplied in less than stoichiometric quantities with respect to said oxime, the reduction to said intermediate reaction product being effected completely by regeneration of said transition metal compound. In this alternative form, the regeneration may be achieved by means of a material reducing agent, for example, zinc amalgam. The regeneration may, however, be achieved electrolytically.

The reduction of the imine to the erythromycylamine compound of Formula I may be effected using a complex metal hydride, for example, sodium or potassium borohydride, or by means of hydrogen over a suitable catalyst, for example, a noble metal catalyst such as platinum, palladium, rhodium or ruthenium which may be used as the free metal or optionally as their oxides, or by means of a highly electropositive metal such as sodium or aluminium preferably in the form of an amalgam. Most advantageously the reduction to the amine is carried out after the completion of the reduction to the imine and preferably after the isolation of that imine from the reaction medium in which it was formed. However the desired erythromycylamine compound can be obtained by carrying out the transition metal ion reduction of the oxime to the imine in the presence of a reducing agent capable of converting the imine to the desired amine, whereby the imine is reduced in situ as soon as it is formed.

In the reduction of the imine intermediate to the desired amine using a complex metal hydride, such as sodium borohydride, substantially complete conversion of the erythromycin A imine and erythromycin B imine intermediates to the corresponding A and B amines is achieved, the reaction apparently being stereo selective. Using other reducing systems varying amounts of the epi-A amine and epi-B amine may be isolated. The products of the process of the present invention are normally isolated by evaporation of the reaction solvent or by solvent extraction.

The intermediate reaction products produced in the transition metal ion reduction of the present invention have been identified as novel imines by the fact that:

(a) the infra-red spectra show a C=N stretch at 1638–1640 cm.$^{-1}$ (KBr);
(b) when examined by thin layer chromatography on silica gel $F_{254}$ using 3:1 methanol:dimethyl formamide as the solvent system, the compounds have $R_f$ values intermediate between those of the corresponding oximes and the corresponding amines;
(c) the compounds gave satisfactory elemental analysis;
(d) a model reaction using the transition metal ion reduction of the present invention when applied to methyl mesityl ketoxime showed complete conversion to the corresponding imine which was identified by spectroscopic methods and by conversion to its known hydrochloride; and
(e) the compounds are so readily reduced to the corresponding erythromycylamine compounds.

The erythromycylamine compounds of Formula I and the intermediate erythromycin imines produced by the process of the present invention, possess antibiotic activity, particularly against gram-positive organisms, and accordingly may be used to treat infections in mammals caused by such organisms. For such use, the compounds will normally be administered in divided dosages of from 0.5 to 2 g. per day, administration usually taking place in the form of a pharmaceutical composition. The latter accordingly form a part of this invention and comprise a therapeutically useful amine of Formula I or intermediate erythromycin imine produced by the process of the present invention in association with a pharmaceutically acceptable carrier therefor. Such compositions are prepared in a well-known manner, preferred compositions being capsules or tablets. The antibiotic amines and imines may also be used to control the population of staphylococci or streptococci present on equipment, furnishings, floors and walls of veterinary, dental and medical premises and in hospitals. For such use, pharmaceutical compositions of the present invention may be formulated as aqueous solutions, usually containing a surface active agent, and the solutions applied to the infected surfaces.

The following examples will further illustrate the present invention:

EXAMPLE 1

Erythromycin A oxime (5 g.) and ammonium acetate (10 g.) were dissolved in methanol (50 ml.) and the solution was stirred under nitrogen. An aqueous solution of titanium trichloride was added slowly until the colour persisted (ca. 10 ml. of 15% w./v. solution) and the solution was stirred for a further 5 minutes.

The product was isolated by partition between water (pH adjusted to 10) and diethyl ether. The ether layer was dried over $MgSO_4$ and filtered and the solvent removed to give a glassy solid (4.8 g.), identified as hereinbefore described as erythromyin A imine. The reaction was also accomplished without the addition of a buffer such as ammonium acetate and using the same procedure, but starting with erythromycin B oxime, erythromycin B imine was prepared.

EXAMPLE 2

In the manner described in Example 1, but using a solution of divalent vanadium chloride (prepared by reduction of a solution of ammonium vanadate with zinc amalgam), erythromycin A imine and erythromycin B imine were prepared.

EXAMPLE 3

A solution of chromium (III) chloride (2 g.) in water (7 ml.) was added to a mixture of zinc dust (0.4 g.) and mercury (1.5 ml.) in a stoppered tube. On stirring, a blue solution containing chromous chloride was obtained.

Erythromycin A oxime (0.3 g.) in methanol (15 ml.) was added and the stirring continued for 30 minutes. Thin layer chromatography indicated reduction in good yield to the erythromycin A imine which was isolated by the solvent extraction method described in Example 1.

EXAMPLE 4

Erythromycin A imine (2 g.) was dissolved in methanol (20 ml.) and sodium borohydride (50 mg., 2 fold excess) added. The solution was stirred for 30 minutes at room temperature. The pH of the solution was adjusted to 2.5 by addition of 3 N HCl and this solution was kept at room temperature for 5 minutes.

Water was added and the solution was extracted with methylene chloride at pH 6.0; 7.0; 8.0; 9.0; 10.0 and 11.0. Each extract was examined by thin layer chromatography. The extracts containing erythromycyl A amine were combined and dried over $MgSO_4$. The solvent was evaporated and the resulting glassy solid dissolved in the minimum volume of diethyl ether. Crystalline erythromycyl A amine was deposited after a few minutes, M.P. 125–127° C. Yield 1.3 g. (65%).

EXAMPLE 5

The same reduction method as used in Example 1 was applied to erythromycin B imine, resulting in the production of erythromycyl B amine as a white solid having a pKa in D.M.F. of 9.7 for the primary amino group and 8.3 for the dimethylamino group of the desosamine moiety.

EXAMPLE 6

Erythromycin A imine (1 g.) was dissolved in methanol (20 ml.) and hydrogenated over Adam's catalyst ($PtO_2$, 250 mg.) at 60 p.s.i. for 24 hours. Thin layer chromatography showed complete reduction of the imine to the erythromycyl A amine, which was isolated by solvent extraction as described in Example 4.

The reduction also proceeded using palladium on charcoal. Using similar procedures, erythromycyl B amine was obtained.

EXAMPLE 7

Erythromycin A imine (1 g.) was dissolved in diethyl ether (20 ml.). Aluminum foil (4 gm.) was amalgamated by allowing small pieces to stand in aqueous mercuric chloride solution for a few minutes. The foil was washed with water and added gradually, without drying, to the ethereal solution.

Reduction to erythromycyl A amine was complete in about two hours. This completion was determined by thin layer chromatography.

Anhydrous magnesium sulphate was then added and after filtration the solvent was removed by evaporation. Erythromycyl A amine was purified by the gradient pH extraction described in Example 4.

Epi-erythromycyl A amine (M.P. 178° C. to 180° C. from ether) was obtained from the extracts of the most basic extraction solution. Similarly erythromycyl B amine and epi-erythromycyl B amine were obtained from erythromycin B imine.

EXAMPLE 8

Erythromycin A oxime (0.001 mole) was dissolved in methanol (10 mls.) and phosphomolybdic acid (0.001 mole) and β-mercaptoethanol (0.002 mole) added. To the resultant solution, sodium borohydride (0.01 mole) was added and the blue solution formed was stirred. After 5 minutes, thin layer chromatography showed partial conversion to the desired amine whilst after 1 hour the conversion was complete. The amine was purified by the gradient pH extraction described in Example 4 to yield crystalline erythromycyl A amine, M.P. 125–127° C.

I claim:

1. Process for preparing erythromycylamine compounds of the formula:

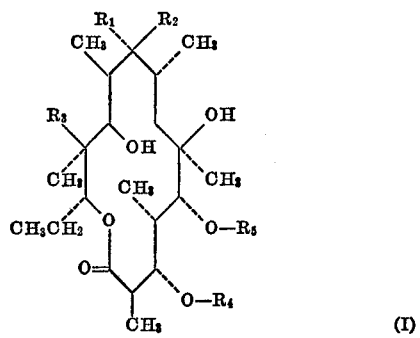

(I)

wherein $R_1$ and $R_2$ are different and are a hydrogen atom or an amino group, $R_3$ is a hydrogen atom or a hydroxy group, $R_4$ is a cladinosyl group and $R_5$ is a desosamininyl group, which process comprises reducing an erythromycin oxime of the general formula:

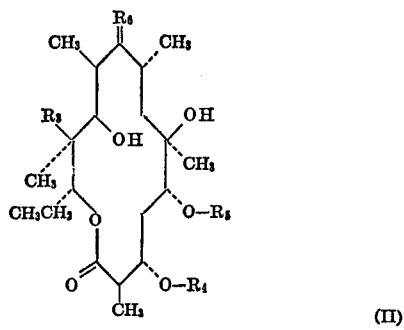

(II)

wherein $R_6$ is an =NOH group and $R_3$, $R_4$ and $R_5$ are as hereinbefore defined for Formula I, with $Ti^{3+}$, $V^{2+}$ or $Cr^{2+}$ ions so as to reduce said oxime to an imine (in which $R_6$ is an =NH group) and thereafter reducing said imine to form said erythromycylamine compound.

2. Process as claimed in claim 1, wherein said metal ions are supplied in stoichiometric quantities with respect to the oxime of Formula II.

3. Process as claimed in claim 1, wherein the resultant imine intermediate is reduced to the desired erythromycylamine compound using a complex metal hydride, or using hydrogen in the presence of a suitable catalyst, or using a highly electropositive metal.

4. Process as claimed in claim 3, wherein said complex metal hydride is sodium or potassium borohydride.

5. Process as claimed in claim 3, wherein said hydrogenation catalyst is a noble metal catalyst of the group platinum, palladium, rhodium or ruthenium.

6. Process as claimed in claim 3, wherein said electropositive metal is sodium or aluminium.

7. Process as claimed in claim 1 for preparing erythromycyl A amine and erythromycyl B amine substantially free of the corresponding epi-isomers, comprising reducing erythromycin A or B oximes respectively to the corresponding imines using $Ti^{3+}$, $V^{2+}$ or $Cr^{2+}$ ions and thereafter reducing the resultant imine with sodium borohydride or potassium borohydride.

8. The process which comprises reducing an imine of the formula

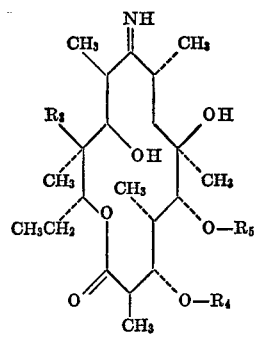

wherein $R_3$ is hydrogen or hydroxyl, $R_4$ is a cladinosyl group and $R_5$ is a desosaminyl group, with a complex metal hydride or hydrogen and a metal to produce erythromycyl A amine or erythromycyl B amine.

References Cited

UNITED STATES PATENTS 3,652,537    3/1972    Massey et al. _____ 260—210 E

JOHNNIE R. BROWN, Primary Examiner

U.S. Cl. X.R.

424—181

J-1050
(5/69)

UNITED STATES PATENT OFFICE
CERTIFICATE OF CORRECTION

Patent No. 3,780,019   Dated   December 18, 1973

Inventor(s)   Eric Wildsmith

It is certified that error appears in the above-identified patent and that said Letters Patent are hereby corrected as shown below:

Column 3, line 22, the word "fact" should be changed to read --facts--.

Column 5, line 48, in the claims the 4-methyl is missing from the formula. The formula should read as follows:

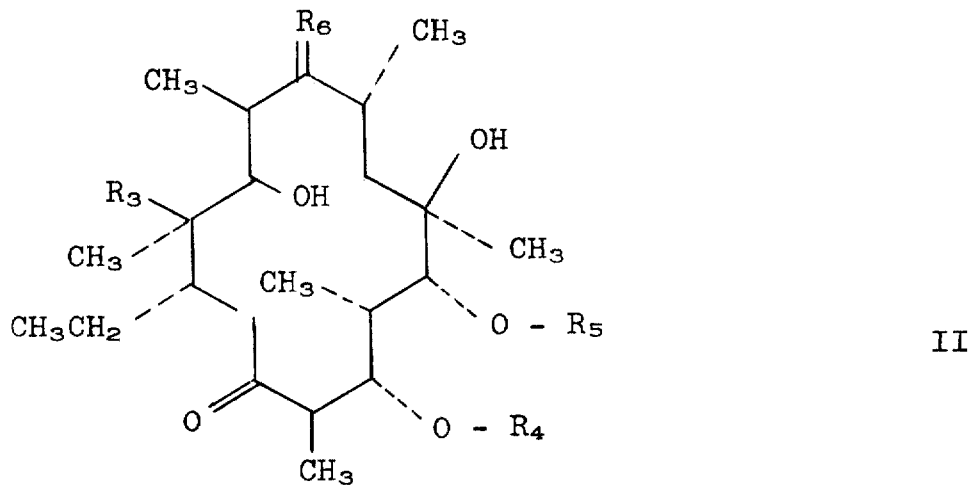

II

Signed and sealed this 17th day of September 1974.

(SEAL)
Attest:

McCOY M. GIBSON JR.
Attesting Officer

C. MARSHALL DANN
Commissioner of Patents